US011593163B2

(12) United States Patent
Venkataraman et al.

(10) Patent No.: US 11,593,163 B2
(45) Date of Patent: Feb. 28, 2023

(54) SELECTING THREADS FOR CONCURRENT PROCESSING OF DATA

(71) Applicant: Oracle International Corporation, Redwood Shores, CA (US)

(72) Inventors: Subramanian Chittoor Venkataraman, Hyderabad (IN); Balender Kumar, Redwood Shores, CA (US); Sai Krishna Sujith Alamuri, Guntur (IN); Murali Krishna Redrowthu, Hyderabad (IN); Srividya Bhavani Sivaraman, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 210 days.

(21) Appl. No.: 17/097,183

(22) Filed: Nov. 13, 2020

(65) Prior Publication Data

US 2021/0064424 A1 Mar. 4, 2021

Related U.S. Application Data

(63) Continuation of application No. 16/164,166, filed on Oct. 18, 2018, now Pat. No. 10,871,989.

(51) Int. Cl.
*G06F 9/48* (2006.01)
*G06N 20/00* (2019.01)

(52) U.S. Cl.
CPC ........... *G06F 9/4881* (2013.01); *G06N 20/00* (2019.01)

(58) Field of Classification Search
CPC .................................................. G06F 9/4881
See application file for complete search history.

(56) References Cited

U.S. PATENT DOCUMENTS

| 5,655,137 | A | 8/1997 | Kevorkian |
| 2002/0194247 | A1 | 12/2002 | Caggese et al. |
| 2004/0139434 | A1 | 7/2004 | Blythe et al. |
| 2008/0022288 | A1 | 1/2008 | Bekooij |
| 2013/0167151 | A1* | 6/2013 | Verma .................. G06F 9/5066 718/102 |
| 2013/0194247 | A1 | 8/2013 | Onoue |

OTHER PUBLICATIONS

Perez, Josep M., Rosa M. Badia, and Jesus Labarta. "A dependency-aware task-based programming environment for multi-core architectures." 2008 IEEE international conference on cluster computing. IEEE, 2008. (Year: 2008).*

* cited by examiner

*Primary Examiner* — Charlie Sun
(74) *Attorney, Agent, or Firm* — Invoke

(57) ABSTRACT

The embodiments disclosed herein relate to using machine learning to allocate a number of concurrent processes for minimizing the completion time for executing a task having multiple subtasks. Historical data comprising a variety of subtask types with actual completion times is mined to create a set of statistical models for predicting completion time for a type of subtask. To minimize the total time to complete execution of a new task, a certain number of threads is allocated to execute subtasks of the new task. The certain number of threads is determined based on the predicted completion time for the subtasks using the respective statistical model. Threads are assigned to subtasks based on the predicted completion time for the subtasks, and the subtasks assigned to each thread are scheduled for execution.

18 Claims, 8 Drawing Sheets

| Task | Est. Time |
|---|---|
| Subtask_01 | 16 |
| Subtask_02 | 1 |
| Subtask_03 | 2 |
| Subtask_04 | 16 |
| Subtask_05 | 4 |
| Subtask_06 | 1 |
| Subtask_07 | 8 |
| Subtask_08 | 8 |
| Subtask_09 | 32 |
| Subtask_10 | 2 |
| Subtask_11 | 4 |

Figure 3A

| Task | Est. Time |
|---|---|
| Subtask_09 | 32 |
| Subtask_01 | 16 |
| Subtask_04 | 16 |
| Subtask_07 | 8 |
| Subtask_08 | 8 |
| Subtask_05 | 4 |
| Subtask_11 | 4 |
| Subtask_03 | 2 |
| Subtask_10 | 2 |
| Subtask_02 | 1 |
| Subtask_06 | 1 |

Figure 3B

| Task | Est. Time | Thread | Start Time |
|---|---|---|---|
| Subtask_09 | 32 | thread 1 | 0 |
| Subtask_01 | 16 | thread 2 | 0 |
| Subtask_04 | 16 | thread 3 | 0 |
| Subtask_07 | 8 | thread 2 | 16 |
| Subtask_08 | 8 | thread 3 | 16 |
| Subtask_05 | 4 | thread 2 | 24 |
| Subtask_11 | 4 | thread 3 | 24 |
| Subtask_03 | 2 | thread 2 | 28 |
| Subtask_10 | 2 | thread 3 | 28 |
| Subtask_02 | 1 | thread 2 | 30 |
| Subtask_06 | 1 | thread 3 | 30 |

Thread 1 finished at time 32
Thread 2 finished at time 31
Thread 3 finished at time 31
Task completed at time 32

Figure 3C

Schedule for 3 threads

Thread 1

Subtask 09

Thread 2

Subtask 02
Subtask 03
Subtask 05
Subtask 07
Subtask 01

Thread 3

Subtask 06
Subtask 10
Subtask 11
Subtask 08
Subtask 04

FIGURE 4

SELECTING THREADS FOR CONCURRENT PROCESSING OF DATA

INCORPORATION BY REFERENCE; DISCLAIMER

The following application is hereby incorporated by reference: application Ser. No. 16/164,166 filed on Oct. 18, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to concurrent processing. Specifically, the disclosure is directed to selecting and assigning a number of concurrent processes for execution of a task.

BACKGROUND

An application that performs a task that comprises multiple subtasks may be configured to concurrently execute two or more subtasks. The application may allocate a separate thread of execution for each of a number of subtasks. Concurrent processing may shorten the time to complete performing the entire task as compared to executing all of the subtasks sequentially.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3A is a table that illustrates an example set of subtasks and the estimated time to complete each subtask, in accordance with one or more embodiments;

FIG. 3B is a table that illustrates sorting the subtasks in FIG. 3A based on the estimated completion time, in accordance with one or more embodiments;

FIG. 3C is a table that illustrates determining the estimated task completion time when allocating three threads to the example subtasks; in accordance with one or more embodiments;

FIG. 4 is a table that illustrates a schedule of subtasks assigned to threads, in accordance with one or more embodiments;

DETAILED DESCRIPTION

Figure 1:
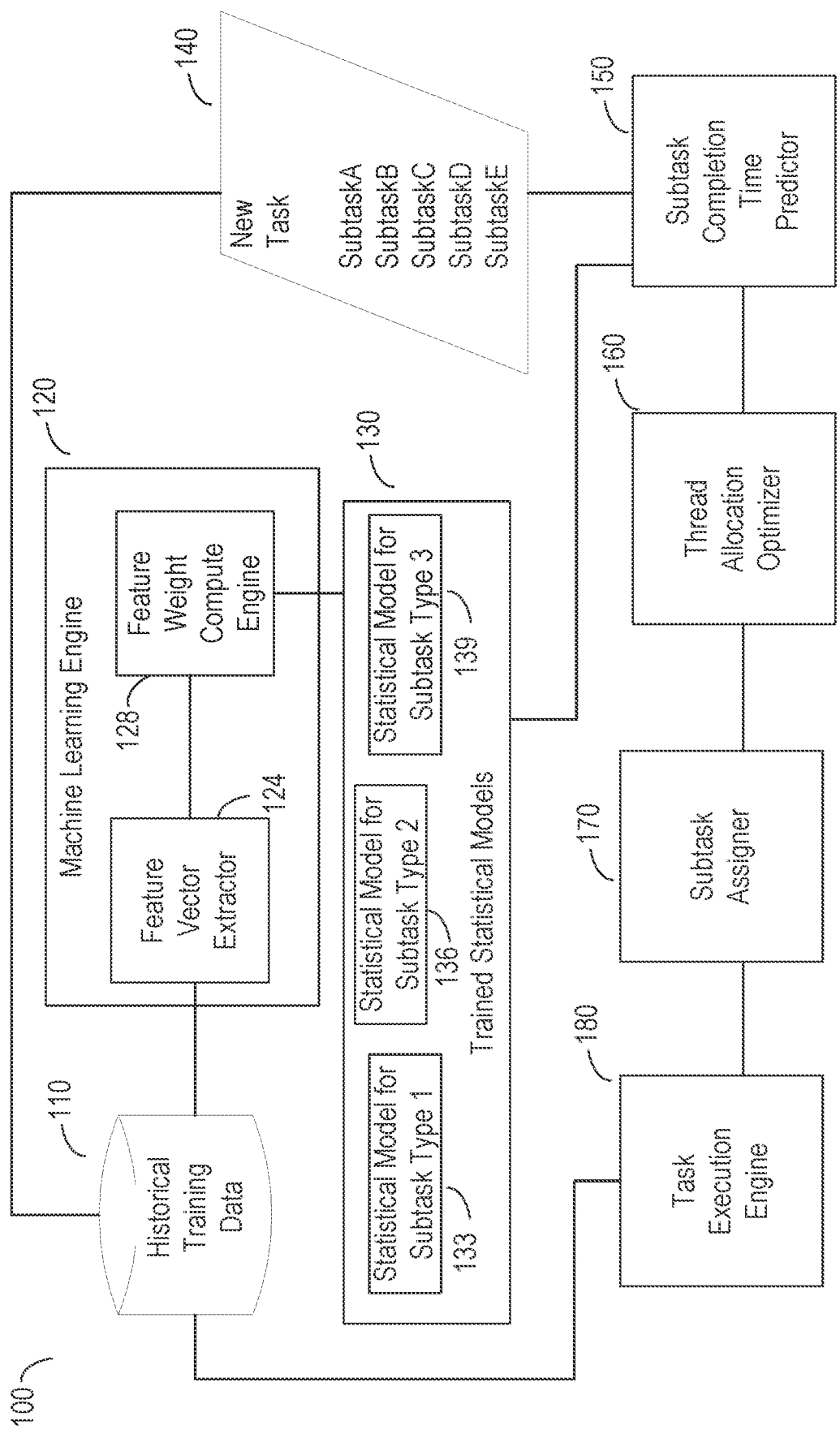
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The terms "concurrent processes," "parallel processes", and "threads" are used interchangeably herein. The number of concurrent processes or threads used within a running application is also referred to herein as a thread pool size.

Determining a number of concurrent processes to employ to minimize task execution time is a difficult problem. Allocating too few threads may result in a greater number of subtasks being executed sequentially even when additional concurrency is possible. However, allocating too many concurrent processes may introduce overhead for thread management. That is, even if each subtask were executed by its own distinct thread (i.e. all subtasks were executed concurrently), the task completion time might not be optimal because addition time is taken for context switching between threads, and the additional time does not contribute towards task completion. Determining the number of threads is also difficult because the optimal thread pool size is not likely to be the same across all applications and tasks. Thus, selecting the number of threads may require knowledge of the goal of a particular tasks and the operations required to execute the subtasks before the particular task is scheduled for execution.

1. General Overview

Some embodiments select a number of parallel processes to execute a task. Parallel processes are referred to herein as threads. Execution of a task involves execution of the subtasks of the task using multiple threads. The system may estimate a total execution time for the task as a function of candidate numbers of threads. As an example, the system may estimate the total execution time for a task as a function of each of 3 threads, 4 threads, and 5 threads. The system selects the number of threads to execute the task based on the estimated execution time corresponding to each of the respective candidate number of threads.

The system may select a lowest candidate number of threads from the subset of the candidate numbers of threads that correspond to a smallest estimated execution time. The system may select a lowest candidate number of threads from the subset of the candidate numbers of threads that correspond to an estimated execution time below a threshold value. The system may select a lowest candidate number of threads from the subset of the candidate numbers of threads that correspond to a particular estimated execution time range. The system may select n threads based on a delta in estimated execution time as compared to n−m threads or n+m threads.

Some embodiments described in this Specification and/or recited in the claims may not be included in this General Overview section.

2. System Components

FIG. 1 is a block diagram that illustrates components of the system, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

System 100 comprises Historical Training Data 110, Machine Learning Engine 120, Trainned Statistical Models 130, New Task 140, Subtask Completion Time Predictor 150, Thread Allocation Optimizer 160, Subtask Assigner 170, and Task Execution Engine 180.

Historical Training Data 110 stores data from previously executed subtasks including at least metadata describing the context of a subtask such as owner and function of the subtask. The data also includes feature values of the subtask that influence the amount of processing needed to complete the subtask, and the actual subtask execution time. The data in the historical training data 110 may be used to train a model for determining how to predict completion time of similar tasks.

Machine Learning Engine 120 uses the training data in historical training data 110 to construct one or more statistical models that take subtask feature values and attributes as input to estimate a completion time for a respective subtask. Machine learning engine 120 comprises Feature Vector Extractor 124 and Feature Weight Compute Engine 128.

Feature vector extractor 124 retrieves the feature values from subtasks in the historical training data 110 and determines which set of features have values that best correlate with the completion times for the respective subtask. (See Appendix A for more information on feature vector extraction) The set of best correlating features comprises a feature vector. The features selected for inclusion in the feature vector may be referred to herein as a predictive feature (that is, a feature selected for its value of predicting a subtask completion time). In an embodiment, a pre-processor may analyze the subtask to determine an amount of I/O, processing cycles, or amount of memory required to execute the subtask. The pre-processor may assign one or more feature values based on the analysis. Other attribute values in the metadata may identify a customer that owns the task and/or whether the task is related to the customer's business or related to a consumer of the customer's goods or services. In addition, a subtask attribute may identify a data repository required for completing the subtask. The location, access load, or other characteristics on the particular data repository may impact the completion time.

When a subtask is finished executing, data collected regarding the execution of the subtask may be recorded and used to predict completion times for newly arrived subtasks. That is, a statistical model may be constructed using the recorded data from subtasks that have completed execution. In an embodiment, a single statistical model may be constructed that considers completion data for all subtasks. In such an embodiment, subtasks are all considered to be of the same type. In another embodiment, each subtask may be assigned one of multiple particular types. Multiple statistical models may be constructed that considers completion data for subtasks that are assigned the same type. Subtasks assigned the same type have certain similar attributes. A statistical model may be created for estimating completion time of subtasks of each respective type. When completion time for a new subtask is about to be estimated, the subtask attributes may be used to assign a type to the subtask, and the respective statistical model for that type may be used to estimate the completion time for the subtask. An example of a group of subtasks may be the set of subtasks that are owned by the same customer. Creating a model on a per customer basis may increase the accuracy of the estimation process.

Feature weight compute engine 128 constructs a statistical model for the feature set of a type of subtask. The model determines a weight for each feature in the feature set. Features that correlate with subtask completion time better than other features in the vector may be assigned a greater weight.

Trained Statistical Models 130 comprises the set of statistical models created by machine learning engine 120. In an embodiment in which subtasks are assigned a type, trained statistical models 130 may comprises a distinct model for each subtask type such as Statistical Models for Subtask Type 1 (133), Subtask type 2 (136) and Subtask Type 3 (139).

After a model is constructed, the model may be used to determine how best to assign worker threads for processing subtasks in a new task to be executed. For example, New Task 140 comprises Subtasks A-E. Subtask Completion Time Predictor 150 computes for each subtask the estimated completion time. Subtask completion time predictor 150 may determine the type of the subtask by obtaining metadata about the subtask, and using the model created for that subtask type to estimate the completion time. Subtask completion time predictor 150 extracts the feature values of the feature set for the model corresponding to the subtask type and plugs the feature values into the model to compute the estimated completion time.

Thread Allocation Optimizer 160 uses the estimated completion times determined for each of the subtasks in new task 140 to determine a number of threads to use to minimize the total execution time to complete the task. Thread allocation optimizer 160 sorts subtasks in order of their estimated completion times, and assigns a particular number of threads to subtasks in their sorted order. Thread allocation optimizer 160 determines a task completion time for each number of threads that may be assigned to executing the subtasks. Thread allocation optimizer compares the task completion times taken for each thread pool size, and selects a number of threads that represents a best tradeoff between minimizing task completion time and minimizing the number of threads. More details of the operation of the thread allocation optimizer 160 are provided in the "Process Description" section below.

Subtask Assigner 170 assigns each subtask of a new task (such as New Task 140) to one of the selected number of threads determined by thread allocation optimizer 160. In an embodiment, one thread of the selected number of threads may be assigned to executed multiple subtasks.

Task Execution Engine 180 executes all assigned threads concurrently. Task execute engine 180 determines for each thread, which assigned subtask to execute.

As each subtask completes execution, the data for the completed subtask along with its actual completion time may be stored in historical training data 110 for use in refining the models as needed.

3. Process Description

Figure 2A:
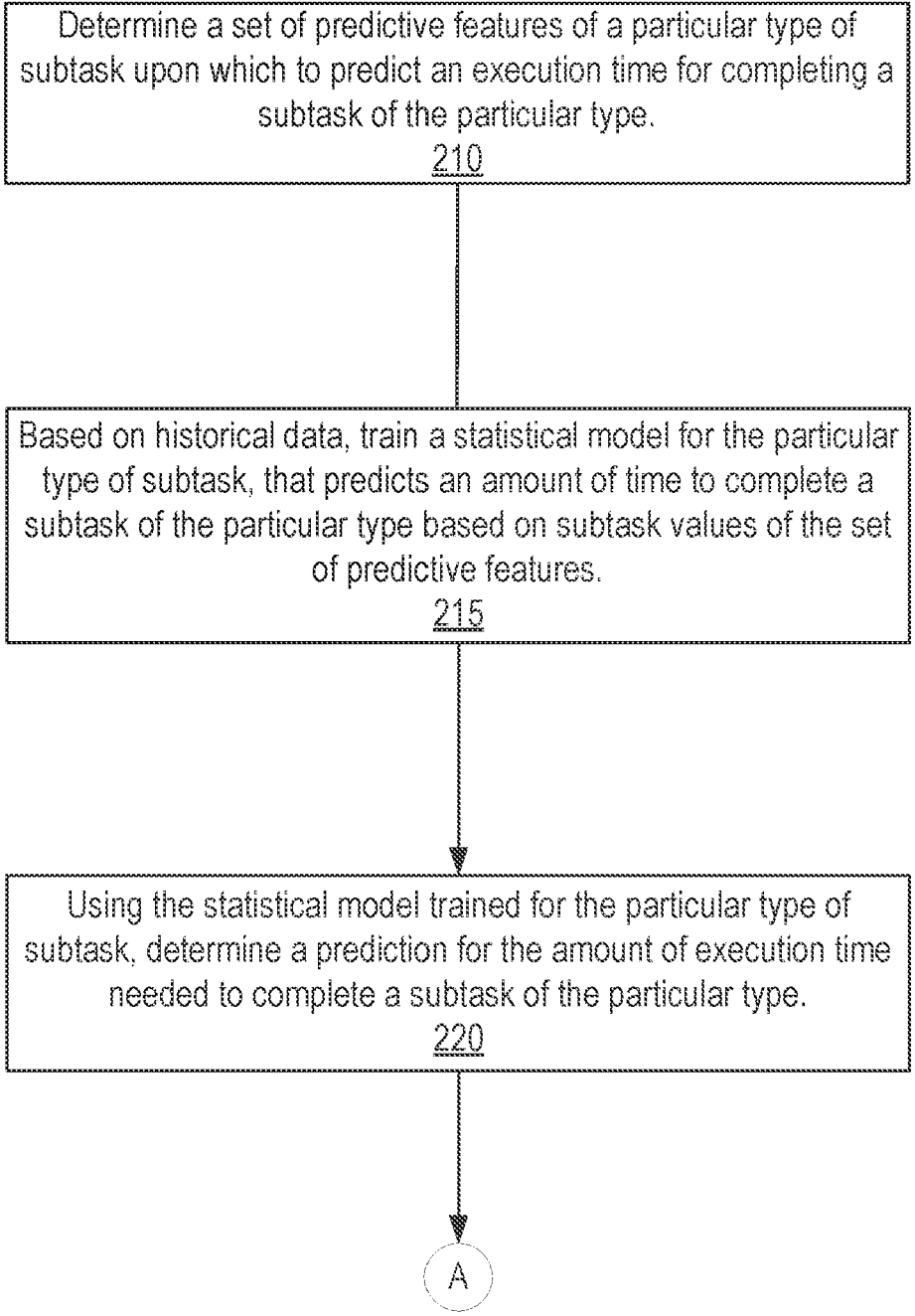
FIG. 2A is a flow diagram that illustrates creating and using a statistical model for estimating a completion time for a subtask, in accordance with one or more embodiments.
Figure 2B:
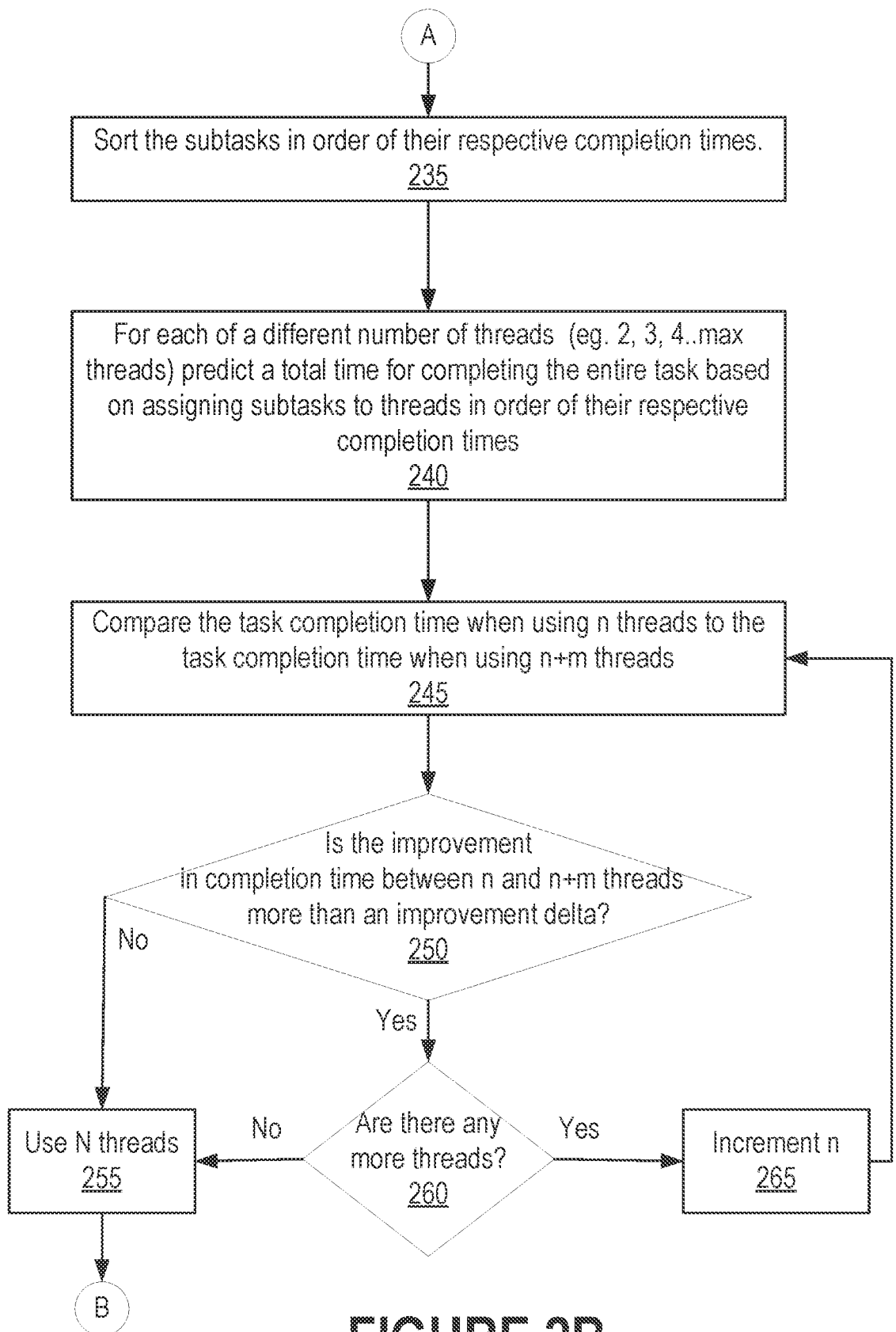
FIG. 2B is a flow diagram that illustrates determining a number of threads based on the estimated completion time for each of a set of subtasks, in accordance with one or more embodiments.
Figure 2C:
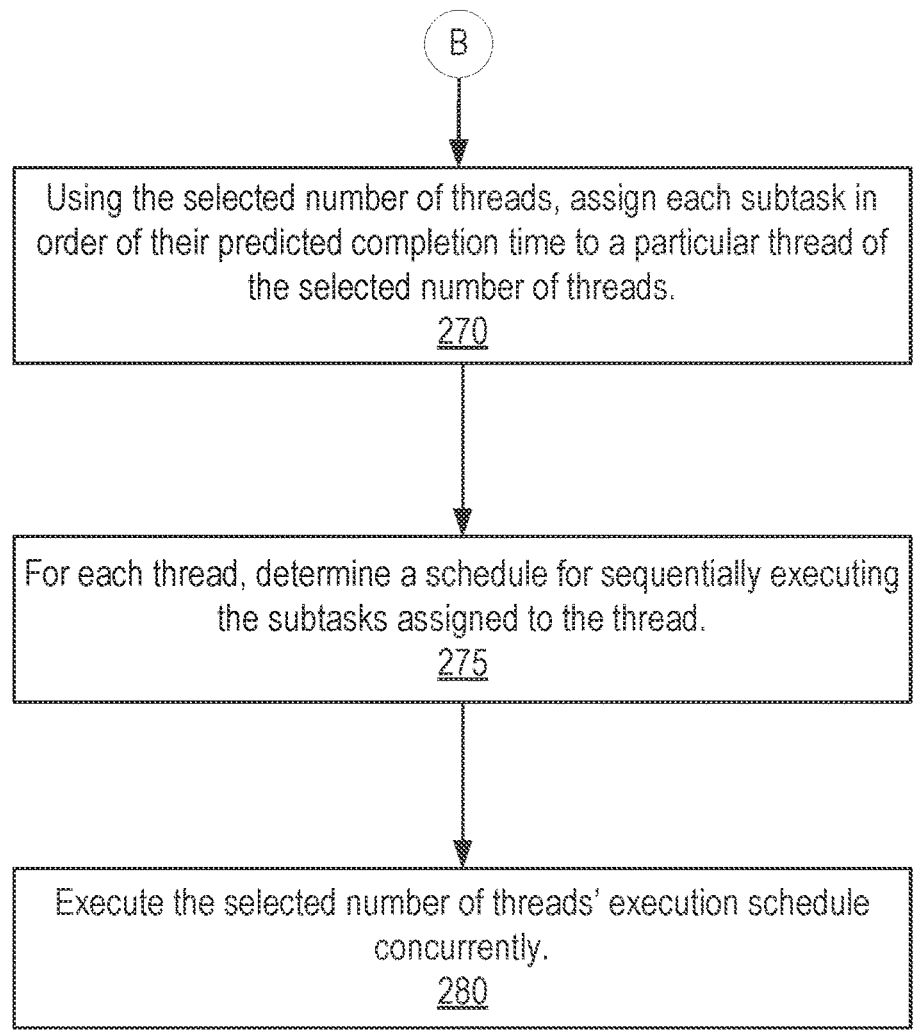
FIG. 2C is a flow diagram that illustrates assigning threads to subtasks, in accordance with one or more embodiments.

FIGS. 2A, 2B, and 2C illustrate the overall system processes. Operations may be added, removed, modified, or combined. Functionality described in relation to one component may instead be implemented by another component. Accordingly, the specific components illustrated and/or described herein should not be construed as limiting the scope of any of the claims.

FIG. 2A is a flow diagram that illustrates creating and using a statistical model for estimating a completion time for a subtask, in accordance with one or more embodiments. Feature vector extractor 124 analyzes historical data to determine features of subtasks that best predict the actual completion time of the analyzed subtasks (Operation 210). As mentioned earlier, in an embodiment, feature vector extractor 124 may analyze together subtasks of the same type, and the extracted feature vector for one subtask type may be different than the feature vector for a different subtask type.

Using the feature set for a particular subtask type, feature weight compute engine uses artificial intelligence to train a statistical model based on previously completed subtasks of the particular type (Operation 215). In an embodiment, multiple linear regression may be used to create the statistical model. Multiple linear regression is a statistical method for estimating the relationship between a dependent variable and two or more independent (or predictor) variables. (See Appendix B for more information on multiple linear regression). In an embodiment, the model may comprise a linear function which is the sum of terms, each term representing a feature of the feature set:

Estimated time=$f1*x1+f2*x2+f3*x3 \ldots fn*xn$, where there are n features in the feature vector. Each term i represents one feature in the feature vector, fi is the coefficient for feature i, and xi represents the value for feature i in the subtask. Constructing the model may comprise determining the coefficient for each feature in the feature set.

In Operation 220, subtask completion time predictor uses the statistical model trained for a particular subtask type to estimate the completion time of a new subtask of that type by providing to the model feature values extracted from the new subtask. FIG. 3A is a table that illustrates an example set of subtasks 1-11 and the estimated time to complete each subtask, in accordance with one or more embodiments. For example, Subtask 1 is estimated to take 16 units of time. For the example embodiment described herein, the unit of time is minutes. Subtask 2 only takes 1 minute, and subtask 9 takes 32 minutes. There may be a wide variation of completion times among subtasks.

FIG. 2B is a flow diagram that illustrates determining a number of threads for executing a task based on the estimated completion time for the task's subtasks, in accordance with one or more embodiments. In an embodiment, the input to the flow of FIG. 2B may be the estimated completion times determined in the flow of FIG. 2A (as represented by connector letter "A"). In another embodiment, the estimated completion times may be determined in some other way.

Thread allocation optimizer 160 may sort the subtasks in order of their completion times (Operation 235). In an embodiment, the subtasks may be sorted with subtasks having the longest completion times first (descending order). In another embodiment, the subtasks may be sorted with subtasks having the shortest completion times first (ascending order). FIG. 3B is a table that illustrates the subtasks in FIG. 3A sorted based on the estimated completion times in the table, in accordance with one or more embodiments. In FIG. 3B, the subtasks are sorted in descending order of their estimated completion times.

Thread allocation optimizer 160 determines an estimated task completion time for a particular thread pool size by analyzing the estimated completion times for the subtasks and determining when all subtasks would complete execution. In the context of this analysis, "assigning a thread to a subtask" does not result in the subtask being executed by the thread. During the process of determining an estimated task completion time for a certain thread pool size, the subtasks are not actually being executed, but the timing of starting and completing execution for a subtasks is simulated. A thread assigned to a subtask is considered to be occupied for the estimated completion time of the subtask, and thus, not available to be assigned to another subtask.

Thread allocation optimizer 160 may determine the task completion time for n number of threads by assigning threads to subtasks in the sorted order. Specifically, thread allocation optimizer 160 may assign each of the n threads to the first n subtasks. The first thread to complete its assigned subtask (i.e. the last assigned thread when sorted in descending order and the first assigned thread when sorted in ascending order) is assigned to the n+1st subtask. Thus, thread allocation optimizer 160 may assign each of the n threads to one or more subtasks. The completion times for the subtasks assigned to the same thread may be added together to obtain a completion time for the thread. Thread allocation optimizer 160 may determine the completion time for a thread pool size of n by comparing the completion times for each of the n threads. The thread allocation optimizer may determine the estimated task completion time when using n threads to be the maximum completion time among the n threads.

FIG. 3C is a table that illustrates an example of determining the estimated task completion time for a particular thread pool size. In this example, the thread pool includes three threads (n=3). The three threads are assigned to the subtasks as sorted in FIG. 3B.

At the beginning (at time 0), threads 1, 2, and 3 are assigned to execute subtasks 9, 1, and 4 respectively.

At time 16, threads 2 and 3 have both completed executing subtasks 1 and 4 respectively, but thread 1 is still executing subtask 9. Thread 2 is then assigned to subtask 7 and thread 3 is assigned to subtask 8.

Eight minutes later, at time 24, threads 2 and 3 complete executing their assigned subtasks 7 and 8. Thread 1 is still working on subtask 9. Threads 2 and 3 are assigned to subtasks 5 and 11 respectively that each take 4 minutes.

At time 28, threads 2 and 3 complete executing subtasks 5 and 11, and are then assigned subtasks 3 and 10 respectively, each taking 2 minutes.

At time 30, subtasks 3 and 10 have completed execution. Thread 1 is still working on subtask 9. Threads 2 and 3 are assigned to subtasks 2 and 6 that each take 1 minute.

At time 31 when subtasks 2 and 6 complete execution, there are no more subtasks. Threads 2 and 3 each take a total of 31 minutes to execute the set of subtasks that each has been assigned, and thread 1 completes its assigned subtask at time 32. Thus, the maximum amount of time taken by any of the three threads is 32 minutes taken by thread 1. Thus, the task completion time when using three threads in this example is 32 minutes.

In Operation 240, thread allocation optimizer 160 estimates task completion times for thread pools ranging in size between 1 and a configured maximum number of threads allowed by the system. In an embodiment, the thread allocation optimizer may compute the task completion times for every sized thread pool before starting analysis of the task completion times to select the thread pool size. In an embodiment in which the maximum number of threads is small, the thread allocation optimizer may sequentially compute the estimated task completion times for each thread pool size. In an alternate embodiment, the thread allocation optimizer may concurrently compute the estimated completion times for each thread pool size. In an embodiment in which the number of subtasks and/or maximum number threads is very large, the thread allocation optimizer may avoid unnecessary computation by delaying determination of task completion time for a particular thread pool size until Operation 245 needs the estimated completion time is needed.

Figure 3D:
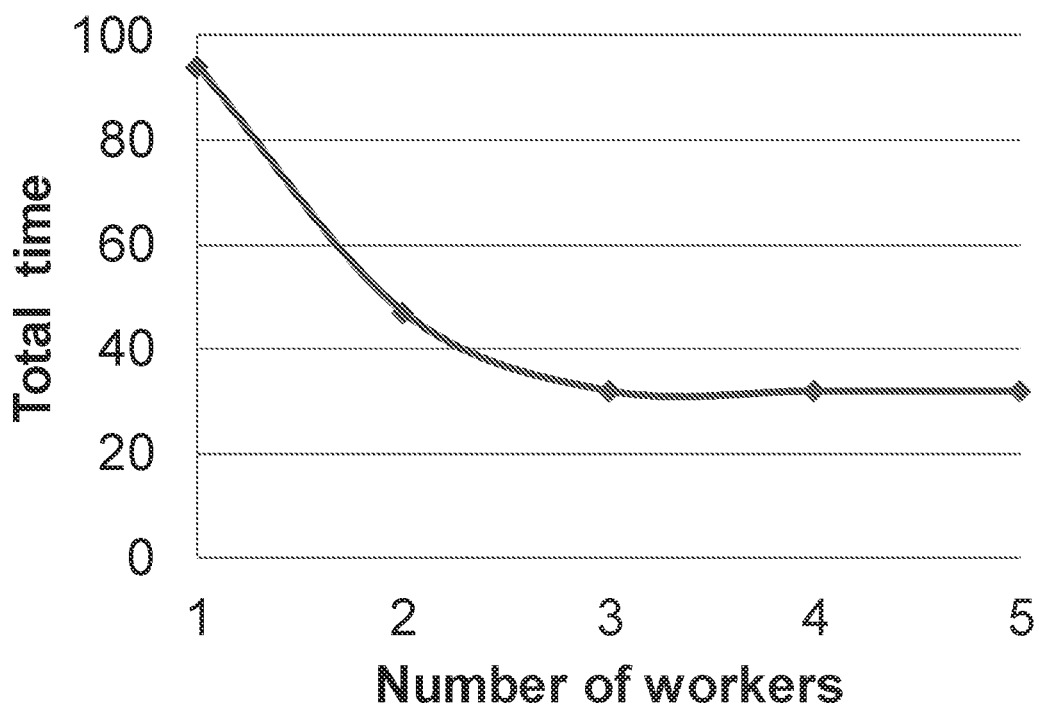
FIG. 3D is a graph that illustrates estimated task completion times for different numbers of worker threads; in accordance with one or more embodiments.
Figure 3E:
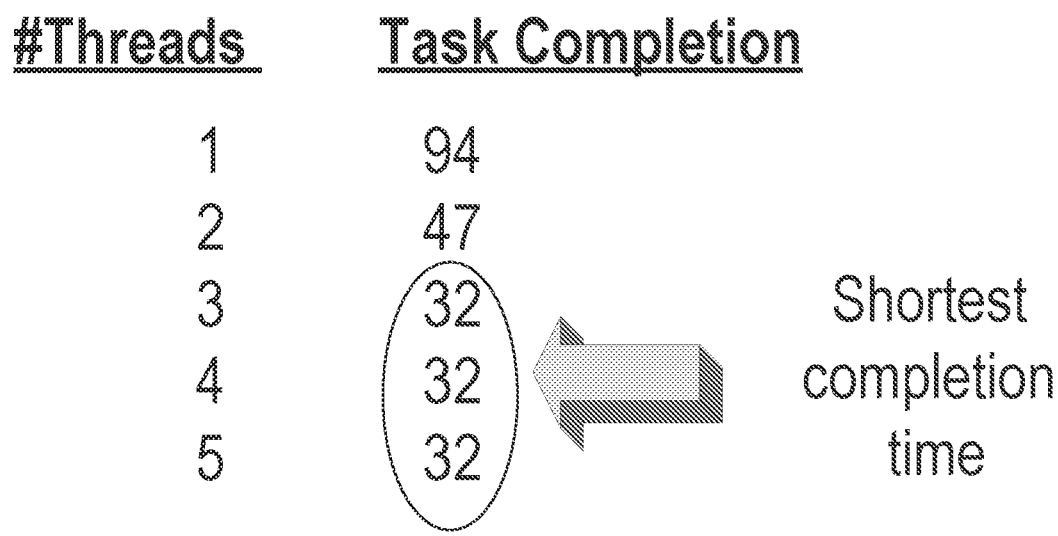
FIG. 3E is a table that illustrates estimated task completion times for different numbers of worker threads; in accordance with one or more embodiments.

FIG. 3D is a graph and FIG. 3E is a table each that illustrates estimated task completion times for different numbers of worker threads; in accordance with one or more embodiments. In the example, the maximum number of threads that may be used for executing subtasks is configured to be 5. The example computation explained above for determining the total task time when using 3 threads is illustrated as 32 minutes. Using one worker thread, the completion time is the sum of all of the subtask estimated completion times because with one thread, all subtasks are executed sequentially. Using two threads, the task completion time is 47. Using four and five threads each complete the task in 32 minutes. Thus, using 3, 4, or 5 threads all provide the minimal task completion time of 32 minutes.

Operation 245 begins a loop in which the thread allocation optimizer compares completion times for subsequent numbers of threads. For example, the task completion time when using 1 thread may be compared to the task completion time when using 2 threads. In general, the task completion time when using n threads may be compared to the task completion time when using n+m threads. In an embodiment, m=1 so that times for 2 and 3 threads are compared, times for 3 and 4 threads are compared, etc. In an embodiment, m may be greater than 1 and/or may vary. In an embodiment, the iteration starting at Operation 245 may start with n=1. However, the starting value of n may be selected depending on the number of subtasks and their relative completion times.

If the task completion time when using n+m threads is enough of an improvement over the task completion time when using n threads, then the thread allocation optimizer increases n and continues iterating until not enough improvement is seen. The amount of improvement is referred to herein as an "improvement delta", or "delta" for short. The improvement delta may be determined in any way. For example, the improvement delta may be an absolute number or a function of the number of threads and/or relative completion times of the subtasks. An improvement delta may be a percentage of the task completion time for n threads.

Continuing with the above example, if the improvement delta is 10%, n starts at 1 thread, and m=1, then the task completion time when using 1 thread, 97, is compared to the task completion time when using 2 threads, 47. Sufficient improvement is determined if 47 is less than 84.6 (90% of 94). Thus using 2 threads provides sufficient improvement over using 1 thread.

If in Operation 250, sufficient improvement was seen, and if in Operation 260 there are at least m more threads that may be used, then in Operation 265, the thread allocation optimizer increments n. In an embodiment, n may be incremented by 1. In an embodiment, n may be incremented by m. The flow iterates at Operation 245 with the new value of n until there are no more threads or until insufficient improvement is seen. In the example, n is incremented by 1 and becomes 2. The task completion time when using 2 threads, 47, is compared to the task completion time when using 3 threads, 32. Sufficient improvement is determined if 32 is less than 90% of 47 (42.3). Thus, using 3 threads provides sufficient improvement over using 2 threads. N is incremented to 3, and the task completion time when using 3 threads, 32, is compared to the task completion time when using 4 threads, also 32.

In Operation 255, if sufficient improvement was not made, then the thread allocation optimizer stops iterating and selects n threads as the number of threads. Sufficient improvement would require the completion time for 4 threads to be less than 90% of 32 (28.8). There is no improvement provided when using 4 threads over using 3 threads. Because using 4 threads does not provide sufficient improvement over using 3 threads, the analysis stops and determines that 3 threads is optimal.

In an embodiment, other ways of determining a number of threads may be used in which a greater number of threads and processors are available and the overhead of computing the number of threads is greater. The goal of such an embodiment may be to minimize the amount of computation needed to determine a number of threads.

The maximum number of threads to consider is the lesser number of subtasks in the tasks and the maximum number of threads that the application is allowed to use. When there are enough threads to allocate a separate thread for each subtask, the shortest completion time for the task as a whole is the longest completion time among all the subtasks. When the number of tasks exceeds the maximum number of threads, applying the maximum number of threads will provide the shortest completion time. However, a smaller number of threads, requiring less thread management and context switching overhead, may be selected that results in a completion time that is within an improvement delta of the shortest possible completion time. For example, if the shortest completion time is 100 and the improvement delta is 10%, then the minimum number of threads providing a task completion time of less than 110 may be selected as the number of threads. In this embodiment, it may not be necessary to compute the completion times for every distinct number of threads. In an embodiment, the minimum number of threads providing an acceptable completion time may be discovered by performing a binary search on the number of threads.

FIG. 2C is a flow diagram that illustrates assigning threads to subtasks, in accordance with one or more embodiments. FIG. 2C illustrates an assignment of subtasks to threads in a pool of threads. In Operation 270, subtask assigner 170 assigns each subtask to a thread in a pool of threads of a selected size. The assignment is performed to subtasks in order of their estimated completion times. In an embodiment, the size of the thread pool may be the number of threads determined in the flow of FIG. 2B (as indicated by connector "B"). In an embodiment, the number of threads in the pool may be determined in another way. The order of the subtasks may or may not be in the same order used to select the number of threads in the flow of FIG. 2B.

In an embodiment, executing one subtask may require input data that is produced when executing another subtask. Thus, the ordering of subtask execution may consider such interdependencies. In such an embodiment, interdependent subtasks may be combined into a single task having an estimated completion time that is the sum of their completion times. The combined tasks may be assigned to the same thread and scheduled according to the dependency.

For each thread that is assigned to at least one subtask, task execution engine 180 determines a schedule (execution order) for the subtasks assigned to the thread (Operation 275). In an embodiment, the subtasks assigned to the same thread may be scheduled in order of their estimated completion times. For example, subtasks having the shortest estimated completion times may be executed first so that there are partial results from the task that a user may inspect or send for further processing without having to wait for the entire task to complete. In an embodiment, the subtasks may be executed in no particular order. For example, if the task is executing in batch mode having no user interaction, the order in which tasks are executed may not matter. In another embodiment, if there are dependencies among subtasks (for example Subtask C depends on Subtask A) the execution of subtasks may be scheduled according to those dependencies (Subtask A may be scheduled to execute before Subtask C).

FIG. 4 is a table that illustrates a schedule of subtasks assigned to threads, in accordance with one or more embodiments. In the example, subtask 9 is assigned to thread 1, subtasks 1, 2, 3, 5, and 7 are assigned to thread 2, and subtasks 4, 6, 8, 10, and 11 are assigned to thread 3. The table of FIG. 4 shows for each thread, the order in which the assigned subtasks are scheduled to be executed. In this example, the subtasks are scheduled in ascending order of their completion times.

In Operation 280, task execution engine 180 launches the threads to execute the subtasks as scheduled. The actual time to complete execution of each subtask may be observed and stored with the subtask information in historical training data 110. The actual time may be compared to the estimated completion time for each task. Re-calibration of the time estimation model for a particular subtask type may be triggered when the actual completion time for some number of subtasks of the type differs from the estimated completion by a certain margin of error. The re-calibration process performed by machine learning engine 120 may use historical data entered into the training data repository after the time estimation model was last created.

4. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
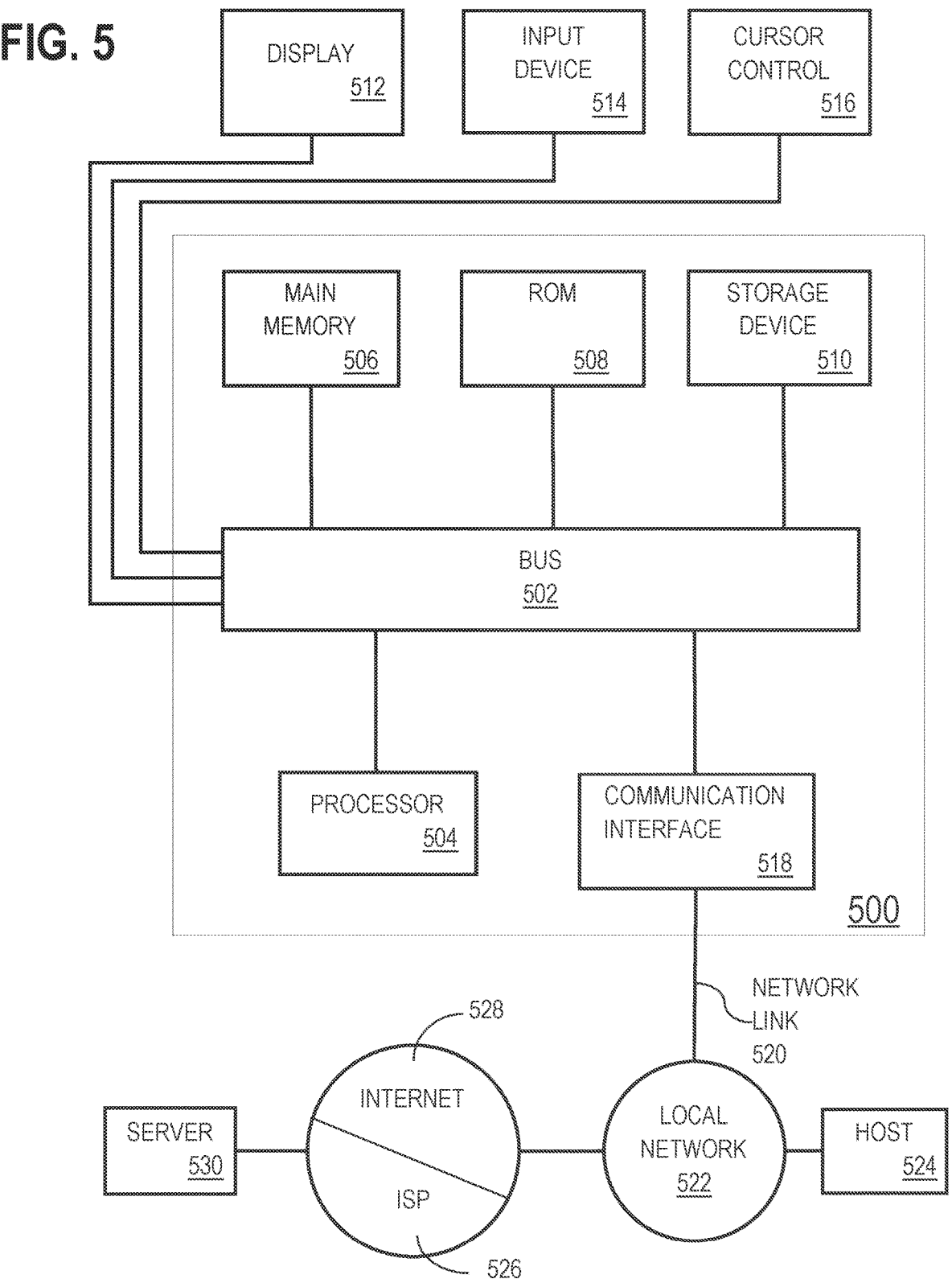
FIG. 5 shows a block diagram that illustrates a computer system, in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a task to be completed using a plurality of threads, the task comprising a plurality of subtasks including a first subtask and a second subtask;

identifying a dependency of the first subtask on the second subtask;
responsive to identifying the dependency of the first subtask on the second subtask:
  combining the first subtask and the second subtask into a single task corresponding to a single task identifier; and
  assigning the single task to a first thread using the single task identifier.

2. The medium of claim 1, further comprising:
computing an estimated time for execution of each subtask of the plurality of subtasks; and
determining an order in which to execute the plurality of subtasks based on the estimated time for execution of each respective subtask,
wherein determining the order in which to execute the plurality of subtasks comprises: arranging a subset of subtasks assigned to each thread, among the plurality of threads, in order from a longest estimated time of execution to a shortest estimated time of execution.

3. The medium of claim 1, further comprising:
computing an estimated time for execution of each subtask of the plurality of subtasks; and
determining an order in which to execute the plurality of subtasks based on the estimated time for execution of each respective subtask,
wherein determining the order in which to execute the plurality of subtasks comprises: arranging a subset of subtasks assigned to each thread, among the plurality of threads, in order from a shortest estimated time of execution to a longest estimated time of execution.

4. The medium of claim 1, wherein assigning the first subtask and the second subtask to the same first thread comprises scheduling the first subtask and the second subtask based on the dependency.

5. The medium of claim 1, wherein assigning the first subtask and the second subtask to the same first thread comprises scheduling the second subtask for execution by the first thread prior to execution of the first subtask by the first thread.

6. The medium of claim 1, further comprising:
computing an estimated time for execution of each subtask of the plurality of subtasks; and
selecting a number of threads to execute the plurality of subtasks based on the estimated time for execution of each subtask of the plurality of subtasks.

7. The medium of claim 1, wherein the operations further comprise:
computing an estimated time for execution of each subtask of the plurality of subtasks;
determining an order in which to execute the plurality of subtasks based on the estimated time for execution of each respective subtask,
wherein computing an estimated time for execution of each subtask of the plurality of subtasks comprises:
  computing a single estimated time for the single task, and
  refraining from computing a first estimated time for the first subtask and a second estimated time for the second subtask,
wherein the order for executing the plurality of subtasks, including the single task, is based at least in part on the single estimated time for execution of the single task.

8. A method, comprising:
identifying a task to be completed using a plurality of threads, the task comprising a plurality of subtasks including a first subtask and a second subtask;
identifying a dependency of the first subtask on the second subtask;
responsive to identifying the dependency of the first subtask on the second subtask:
  combining the first subtask and the second subtask into a single task corresponding to a single task identifier; and
  assigning the single task to a first thread using the single task identifier.

9. The method of claim 8, further comprising:
computing an estimated time for execution of each subtask of the plurality of subtasks; and
determining an order in which to execute the plurality of subtasks based on the estimated time for execution of each respective subtask,
wherein determining the order in which to execute the plurality of subtasks comprises: arranging the plurality of subtasks in order from a longest estimated time of execution to a shortest estimated time of execution.

10. The method of claim 8, further comprising:
computing an estimated time for execution of each subtask of the plurality of subtasks; and
determining an order in which to execute the plurality of subtasks based on the estimated time for execution of each respective subtask,
wherein determining the order in which to execute the plurality of subtasks comprises: arranging the plurality of subtasks in order from a shortest estimated time of execution to a longest estimated time of execution.

11. The method of claim 8, wherein assigning the first subtask and the second subtask to the same first thread comprises scheduling the first subtask and the second subtask based on the dependency.

12. The method of claim 8, wherein assigning the first subtask and the second subtask to the same first thread comprises scheduling the second subtask for execution by the first thread prior to execution of the first subtask by the first thread.

13. The method of claim 8, further comprising:
computing an estimated time for execution of each subtask of the plurality of subtasks; and
selecting a number of threads to execute the plurality of subtasks based on the estimated time for execution of each subtask of the plurality of subtasks.

14. A system comprising:
one or more hardware processors;
a memory storing instructions which, when executed by the one or more hardware processors, cause:
identifying a task to be completed using a plurality of threads, the task comprising a plurality of subtasks including a first subtask and a second subtask;
identifying a dependency of the first subtask on the second subtask;
responsive to identifying the dependency of the first subtask on the second subtask:
  combining the first subtask and the second subtask into a single task corresponding to a single task identifier; and
  assigning the single task to a first thread using the single task identifier.

15. The system of claim 14, further comprising:
computing an estimated time for execution of each subtask of the plurality of subtasks; and
determining an order in which to execute the plurality of subtasks based on the estimated time for execution of each respective subtask, wherein determining the order in which to execute the plurality of subtasks comprises: arranging the plurality of subtasks in order from a longest estimated time of execution to a shortest estimated time of execution.

16. The system of claim 14, wherein the instructions further cause:
   computing an estimated time for execution of each subtask of the plurality of subtasks; and
   determining an order in which to execute the plurality of subtasks based on the estimated time for execution of each respective subtask,
   wherein determining the order in which to execute the plurality of subtasks comprises: arranging the plurality of subtasks in order from a shortest estimated time of execution to a longest estimated time of execution.

17. The system of claim 14, wherein assigning the first subtask and the second subtask to the same first thread comprises scheduling the first subtask and the second subtask based on the dependency.

18. The system of claim 14, wherein assigning the first subtask and the second subtask to the same first thread comprises scheduling the second subtask for execution by the first thread prior to execution of the first subtask by the first thread.

* * * * *